UNITED STATES PATENT OFFICE.

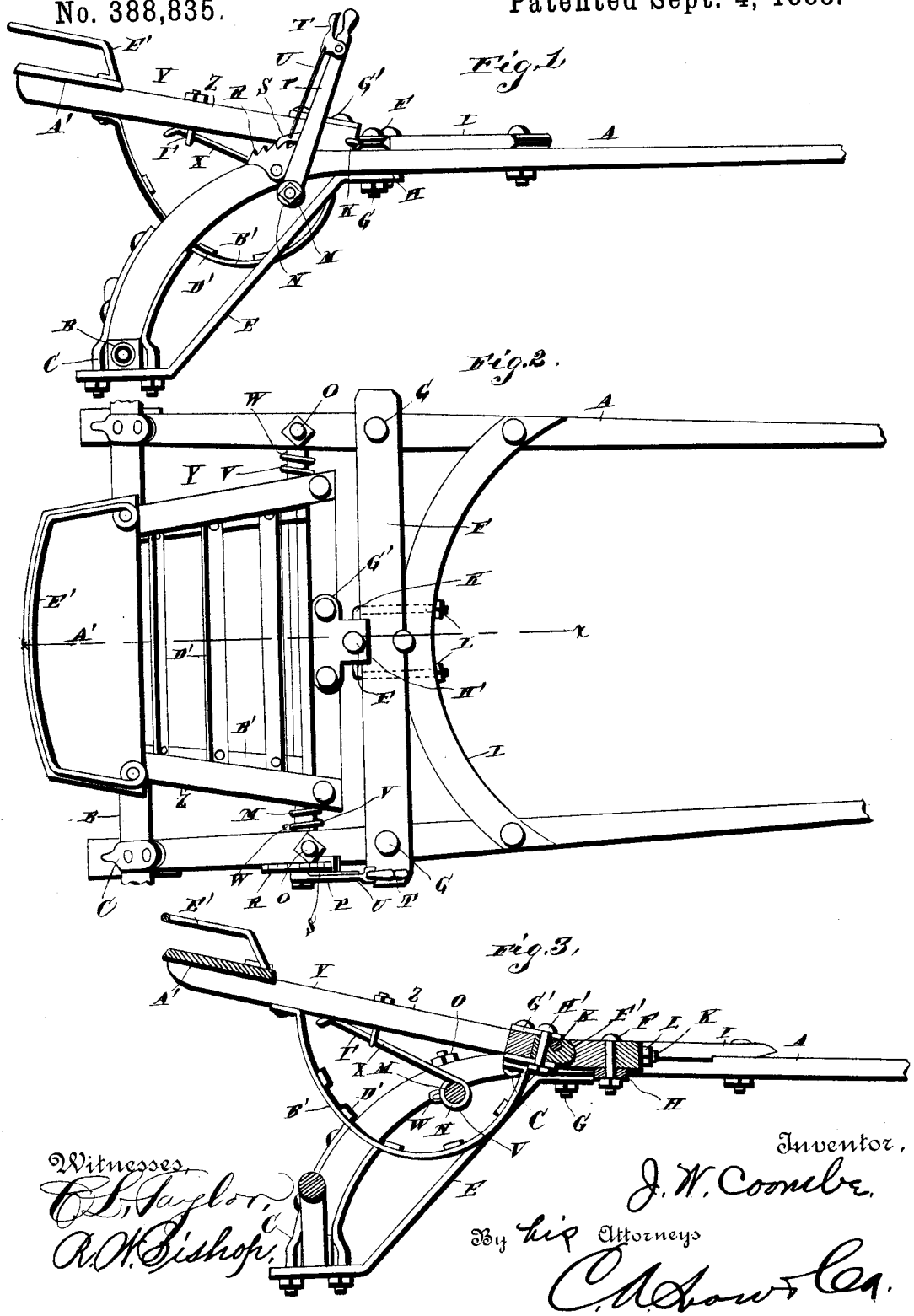

JOHN WHEELER COOMBE, OF STURGEON, MISSOURI.

ROAD-CART.

SPECIFICATION forming part of Letters Patent No. 388,835, dated September 4, 1888.

Application filed March 30, 1888. Serial No. 269,028. (No model.)

*To all whom it may concern:*

Be it known that I, JOHN WHEELER COOMBE, a citizen of the United States, residing at Sturgeon, in the county of Boone and State of Missouri, have invented new and useful Improvements in Road-Carts, of which the following is a specification.

My invention relates to an improvement in road-carts; and it consists in the peculiar construction and combination of devices that will be more fully set forth hereinafter, and particularly pointed out in the claims.

In the accompanying drawings, Figure 1 is a side elevation of a road-cart embodying my improvements. Fig. 2 is a top plan view of the same. Fig. 3 is a vertical longitudinal sectional view of the same, taken on the line *x x* of Fig. 2.

A represents a pair of thills, of the usual construction, which have their rear ends secured to an arched axle, B, near the extremities thereof, by means of clip-bolts C. The said thills are provided with forwardly-inclined braces E, which extend from the clip-bolts that connect them to the axle to points below the cross-bar F, the front ends of the said brace-rods being secured on the lower ends of the bolts G that connect the cross-bars to the thills. The whiffletree H is centrally pivoted to the under side of the cross-bar, and a curved brace-bar, I, is arranged on the front side of the central portion of the cross-bar, and has its ends bolted to the thills, as shown.

K represents a U-shaped bolt, which has its arms extending forward through openings in the cross-bar and in the curved bar I, and is provided on the front end of its arms with clamping-nuts L, whereby the central portion of the curved brace-bar is rigidly secured to the center of the cross-bar. By this means the thills are very effectually braced, and are rendered sufficiently strong and very durable.

M represents a rock-shaft, which is arranged transversely under the thills at a suitable distance in rear of the cross-bar, and is journaled in the lower ends of eyebolts N, the said eyebolts passing upward through the thills and being provided on their upper ends with nuts O, as shown. One end of the rock shaft projects a slight distance beyond the outer side of one of the thills, and is provided with a lever, P. The said lever sweeps on a sector-plate, R, which is secured on the outer side of the adjacent thills, and the said sector-plate is provided on its upper edge with a series of ratchet-teeth. The lever has a dog, S, which is adapted to engage the said ratchet-teeth, and is further provided with a pivoted handle, T, connected to the said dog by means of a link, U, whereby the dog may be caused to engage or disengage the ratchet-teeth. By this means the rock-shaft may be secured in any desired position, as will be readily understood.

V represents a pair of springs, which are coiled around the rock-shaft, near the ends thereof, have their outer ends secured to ears W that depend from the rock shaft, and have their inner ends extended rearward and forming arms X.

Y represents the body of the vehicle, which comprises a U-shaped frame, Z, having the seat-board A' connecting the rear ends of its arms. Said frame may be formed of three (3) bars bolted together at their corners, or it may be formed of a single bar of suitable length bent into the required form.

B' represents a pair of curved straps which depend from the frame Y, have their front ends suspended from the front side of the frame and engaged with eyebolts C', and have their rear ends bolted to the under sides of the arms of the frame, near the rear end of said arms. Arranged transversely on the said straps and connecting the same are a series of parallel bottom bars, D', which are arranged at suitable regular distances apart. The seat-board is provided with a side railing, E', which is preferably made of a single rod of metal bent in the required form, and having eyes formed at its ends and bolted to the front corners of the seat-board.

F' represents a block which is pivoted on the horizontal rear portion of the U-shaped bolt N.

G' represents a pair of plates, which are bolted on the upper and lower sides of the front of the frame Z, at the center thereof, and are provided with forwardly-extending ears which bear upon the upper and lower sides of the block F'. A vertical bolt, H', passes through aligned openings in the said ears and in the said block, and thereby serves to couple said frame Z to the block. By reason of the said vertical bolt the frame or body is adapted to be vibrated laterally, and by reason of the block F' being pivoted horizontally on the bolt N the body is adapted to be inclined to any desired angle and to rock in a vertical direction. The rearwardly-extending arms of the springs are arranged under the sides of the frame Z, and pass through guides I', with which the said frame is provided, the function of these springs being to support the body, as will be readily understood. By disengaging the pawl from the segment-plate and inclining the hand-lever rearward the rock-shaft is partly rotated, so as to lower the rearwardly-extending spring-arms, and thereby cause the rear end of the body to be lowered, and by moving the said hand-lever forward the rock-shaft is partly rotated in the opposite direction, thereby causing the spring-arms to raise the rear end of the body. By this means the seat may be adjusted to any desired position. The springs being coiled along the rock-shaft are rendered exceedingly strong and durable, and are adapted to sustain any weight which the cart will ever be required to carry.

Inasmuch as the body is adapted to rock or play both vertically and laterally, the unpleasant swaying motion of the horse communicated to the thills is prevented from being communicated to the body, and thereby the cart is rendered extremely easy and pleasant to the rider.

Having thus described my invention, I claim—

1. The combination, in a two-wheeled vehicle, of the rock-shaft, devices, substantially as set forth, to secure said shaft in any desired position, the springs or spring-arms extending rearward and upward from the said rock-shaft, and the body having its front end flexibly coupled to the cross-bar of the thills, said body being supported on the spring-arms, substantially as described.

2. In a road-cart, the combination of the thills having the cross-bar, the block F', horizontally pivoted to the center of the cross-bar, the body having the forwardly-projecting plates or ears at its front end pivoted vertically to the block F', and the springs supporting the rear end of the body, substantially as described.

3. The combination, in a road-cart, of the thills, the body having its front end flexibly coupled to the cross-bar of the thills, the rock-shaft journaled transversely to the thills and having the lever, and devices to lock the latter in any desired position, for the purpose set forth, and the springs secured to the rock-shaft, coiled thereon, and having the rearwardly-extending arms supporting the body, substantially as described.

4. The combination, in a road-cart, of the axle, the thills connected thereto having the cross-bar, the curved brace-rod I, connecting the thills, the bolt connecting the central portion of the curved brace-bar to the central portion of the cross-bar, the block F', journaled horizontally on the said cross-bar, the body having the forwardly-extending plates or ears pivoted vertically to the said block, and the springs supporting the body, substantially as described.

5. In a road-cart, the thills, the body having its front end flexibly coupled to the thills, substantially as described, whereby the body is adapted to swing both vertically and horizontally, the rock-shaft, devices, substantially as described, to secure said shaft in any desired position, and the spring-arms connected to and adjusted by the rock-shaft, said springs or spring-arms supporting the body, as set forth.

6. The road-cart herein described, comprising the rock-shaft, the pawl, ratchet, and lever for adjusting the position of the rock-shaft, the body flexibly connected at its front end to the thills, and the springs or spring-arms connected to and adjusted by the rock-shaft, said spring or spring-arms supporting the seat, as set forth.

In testimony that I claim the foregoing as my own I have hereto affixed my signature in presence of two witnesses.

JOHN WHEELER COOMBE.

Witnesses:
   JOSEPH T. PRATHER,
   C. H. PRATHER.